(12) United States Patent
Ghebrebrhan et al.

(10) Patent No.: US 11,822,105 B1
(45) Date of Patent: Nov. 21, 2023

(54) PARTICLE-FILLED RETROREFLECTIVE FIBER

(71) Applicant: U.S. Government as Represented by the Secretary of the Army, Natick, MA (US)

(72) Inventors: Michael Ghebrebrhan, Cambridge, MA (US); Eric Wetzel, Bel Air, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 62 days.

(21) Appl. No.: 17/543,800

(22) Filed: Dec. 7, 2021

Related U.S. Application Data (60) Provisional application No. 63/124,142, filed on Dec. 11, 2020.

(51) Int. Cl.
    *G02B 5/12* (2006.01)
    *D01F 8/04* (2006.01)

(52) U.S. Cl.
    CPC ................. *G02B 5/12* (2013.01); *D01F 8/04* (2013.01); *D10B 2401/20* (2013.01)

(58) Field of Classification Search
    None
    See application file for complete search history.

(56) References Cited

U.S. PATENT DOCUMENTS

| | | |
|---|---|---|
| 4,336,092 A | 6/1982 | Wasserman |
| 8,033,671 B1 | 10/2011 | Nilsen et al. |
| 10,427,367 B1 | 10/2019 | Ghebrebrhan et al. |
| 2011/0170193 A1 | 7/2011 | Budd et al. |
| 2018/0127915 A1 | 5/2018 | Nowak et al. |
| 2018/0291175 A1 | 10/2018 | Wilding et al. |

*Primary Examiner* — Ramsey Zacharia (57) ABSTRACT

The disclosed subject matter relates to relate to fibers, textiles, fabrics, clothing and methods that are retroreflective including fibers having a hollow sheath that is filled with retroreflective particles.

20 Claims, 11 Drawing Sheets

PARTICLE-FILLED RETROREFLECTIVE FIBER

CROSS-REFERENCE TO RELATED APPLICATIONS

This application claims priority to and the benefit of U.S. Provisional Patent Application Ser. No. 63/124,142 filed Dec. 11, 2020, the disclosure of which is incorporated herein by reference in its entirety.

STATEMENT OF GOVERNMENT INTEREST

The invention described herein may be manufactured and used by or for the U.S. Government for governmental purposes without the payment of any royalties thereon or therefor.

FIELD

The aspects of the present disclosure relate to fibers, textiles, fabrics, clothing and methods that are retroreflective.

BACKGROUND

Retroreflective surfaces can increase visibility in low visibility conditions. Desirable end products for retroreflective surfaces include clothing which are constructed of and include retroreflective material, such as, for example, retroreflective fibers, textiles and fabrics. Retroreflectivity is the property whereby incident light from a localized source, for example a headlight, flashlight, or the moon, is mostly returned to the source even if the reflecting surface is not facing the source. Typically, such surfaces are constructed from an array of miniaturized refractive elements bonded onto a reflective surface.

Retroreflective fibers having a fiber with a complex cross-section with regions of reflective metal inside near the outer surface (U.S. Pat. No. 10,427,367) have been used. The fiber has a ring of round protrusions that focus light towards the metal to be reflected back out. The disadvantage of this approach is the difficulty in making such a fiber. While they have been successfully manufactured, more research and investment is needed to perfect the process of drawing this fiber with the high density, molten metal inside. Also, the rough surface texture of using such fibers presents a snag/abrasion challenge, likely resulting in poor durability of the fiber. Retroreflective articles and garments have also been used (U.S. Patent Publication No. 2011/0170193).

Another approach involves placing transparent plastic or glass beads on the outside circumference of the fiber (U.S. Patent Publication No. 2018/0127915). Its disadvantage is in constructing the fiber, one has to coat a core filament with a polymer coating and then a thin metallic coat and then the transparent beads. Furthermore, the fiber is also not durable or robust, properties that are particularly critical for military applications.

Still another approach involves dispersing retroreflective beads throughout the fiber (U.S. Patent Publication No. 2018/0291175), but doing so requires retroreflective spheres with a refractive index even higher than 1.8-1.9 the optimal range of for such values. This increases the difficulty as commonly available transparent materials with such indices are not readily available.

Other approaches create a retroreflective film and then slice it into thin ribbons to function as fibers (U.S. Pat. Nos. 8,033,671 and 4,336,092). One disadvantage here is that such ribbons cannot easily be cut into fiber-sized ribbons and still maintain a high degree of retroreflectivity. The act of slicing the film can also destroy some of the embedded retroreflective spheres and the sides of the ribbons will not be retroreflective. As the ribbons get thinner, this becomes even more of an obstacle.

It would be desirable to have a retroreflective fiber as well as textiles or fabrics made therefrom and products such as garments and shelters where the retroreflective properties and features are maximized.

DESCRIPTION OF THE DRAWINGS

The accompanying drawings illustrate presently preferred embodiments of the present disclosure, and together with the general description given above and the detailed description given below, serve to explain the principles of the present disclosure.

SUMMARY

In one embodiment, a retroreflective fiber is provided. The retroreflective fiber includes a sheath comprised of one or more transmissive materials; a hollow core wherein the hollow core is circumscribed by the sheath and extends longitudinally along the length of the retroreflective fiber; and one or more retroreflective particles disposed in the hollow core.

In another embodiment, a retroreflective fabric is provided. The retroreflective fabric includes at least one retroreflective fiber. The at least one retroreflective fiber includes a sheath comprised of a transmissive material; a hollow core wherein the hollow core is circumscribed by the sheath and extends longitudinally along the length of the retroreflective fiber; and one or more retroreflective particles disposed in the hollow core.

In another embodiment, a retroreflective fiber is provided. The retroreflective fiber includes a sheath comprised of a transmissive material; a core that includes both solid and hollow portions, wherein the core is circumscribed by the sheath and extends longitudinally along the length of the retroreflective fiber; and one or more retroreflective particles disposed in the hollow portions of the core.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Unless otherwise indicated, all numbers expressing quantities of ingredients, reaction conditions, and so forth used in the specification and claims are to be understood as being modified in all instances by the term "about" or "approximate." Accordingly, unless indicated to the contrary, the numerical parameters set forth in this specification and attached claims are approximations that may vary depending upon the desired properties sought to be obtained by embodiments of the present disclosure. As used herein, "about" or "approximate" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

The terms "%", "% by weight", "weight %" and "wt %" are all intended to mean unless otherwise stated, percents by weight based upon a total weight of 100% end composition weight. Thus 10% by weight means that the component constitutes 10 wt. parts out of every 100 wt. parts of total composition.

Aspects of the present disclosure include fibers, textiles, fabrics, clothing, shelters, parachutes, composites, and methods of using and making same that are retroreflective. More particularly, the present disclosure includes a retroreflective fiber that reflects light back towards the source. When woven into a textile or fabric which are then used to produce clothing, it enables the textile and other resulting products to have retroreflective properties while retaining breathability and ability to be colored. While designed to work with visible light, this fiber can be designed to work in the infrared spectrum with a different filling.

Figure 1A:
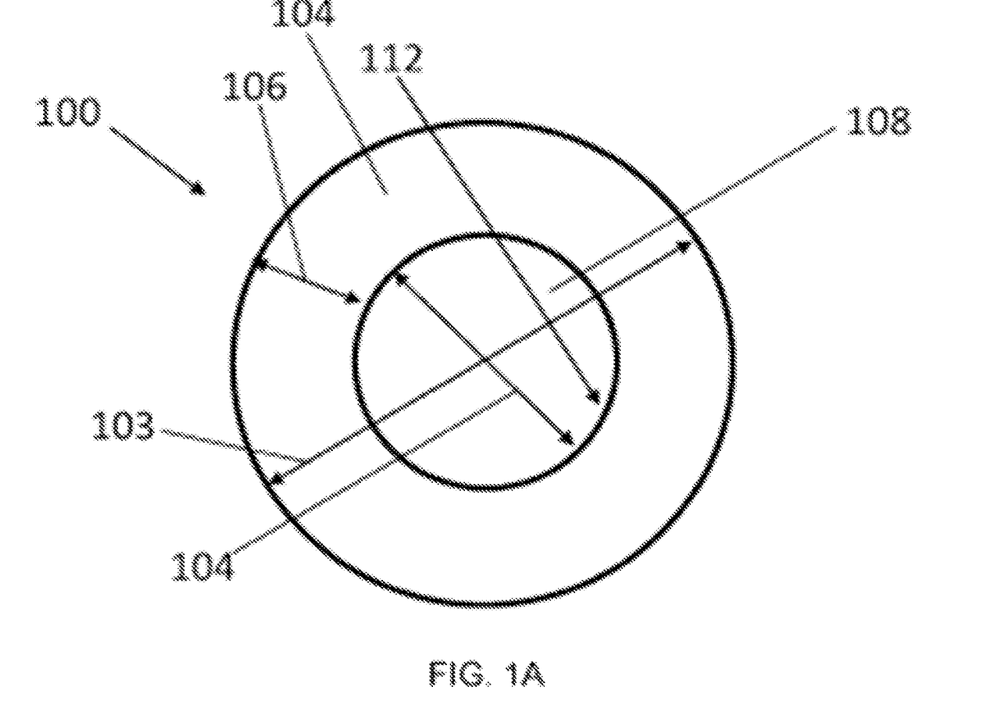
FIGS. 1A and 1B are a cross-section view and a perspective view, respectively, of an exemplary illustration of a fiber embodiment of the present disclosure.
Figure 1B:
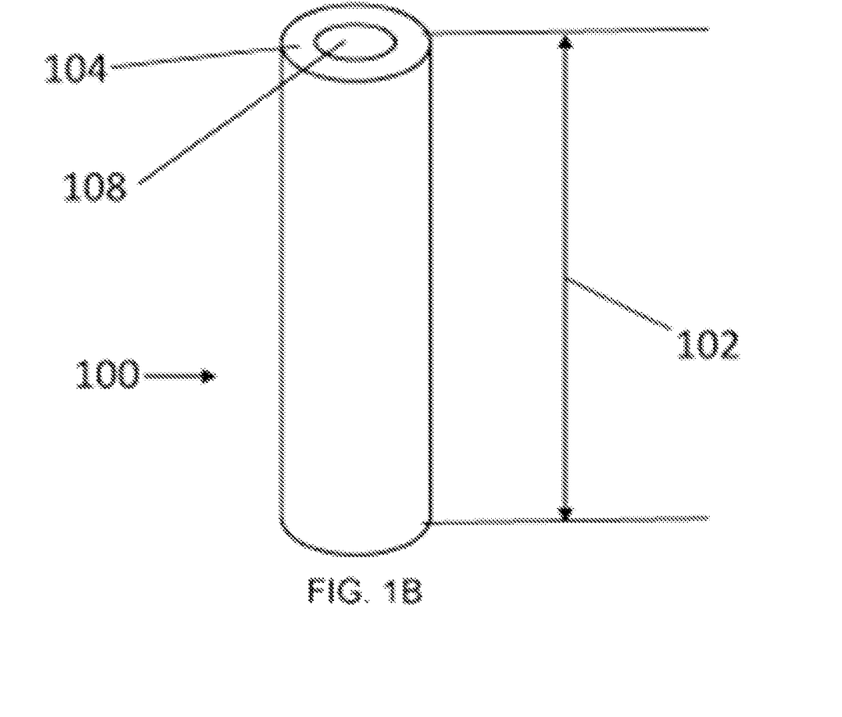

One embodiment of a fiber included in embodiments of the present disclosure includes a hollow sheath, for example, a hollow elongated sheath, a generally round hollow elongated sheath that is filled with retroreflective particles. An embodiment of the present disclosure includes a generally round hollow sheath illustrated in FIGS. 1A and 1B. FIGS. 1A and 1B include a retroreflective fiber 100 having a length 102, a sheath 104 with a wall thickness 106, and a cross-sectional diameter 103 of from about 5 to about 5000 μm, a hollow core 108 which is generally centrally located (e.g., maintaining a generally consistent sheath wall thickness 106 surrounding the hollow core 108 for the length of the length 102 of the sheath 104) with a generally round cross-section having a generally consistent diameter that runs the length 102 of the sheath 104 while maintaining a generally consistent diameter. However, the cross-section shape is not limited to a round shape and can be, for example, elliptical; a square, rectangle (e.g., the rectangular embodiment with rounded corners shown in FIG. 8), ribbon, triangle, hexagon, or other polygon; could be faceted to include arms or recesses; and may include any number of convex, concave, and flat perimeter segments.

Figure 5:
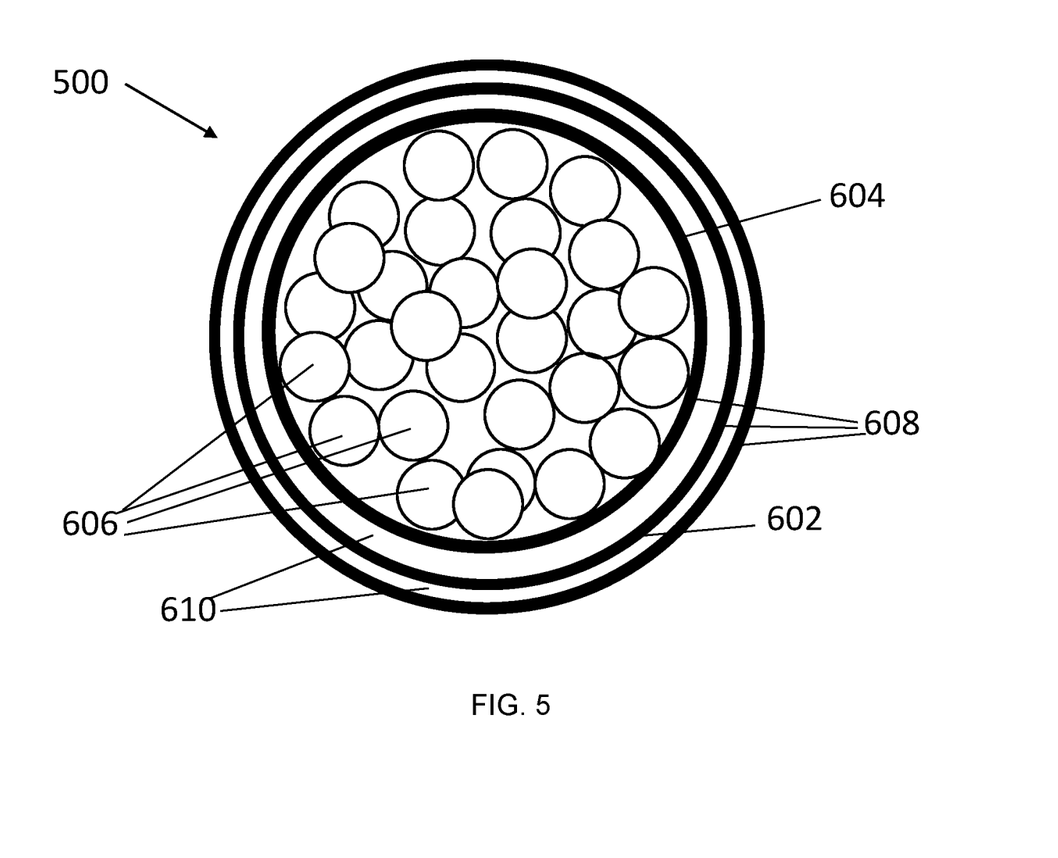
FIG. 5 is a cross-sectional view of a retroreflective fiber embodiment of the present disclosure, including a sheath that is a lens, grating, or filter that enhances the retroreflective performance of the fiber.

The sheath included in embodiments of the present disclosure can be made from a transmissive material, for example, a material that allows at least about 5% of photons from a broad visible light source or an infrared light source to pass therethrough, a material that allows at least about 50% of photons from a broad visible light source or an infrared light source to pass therethrough, or a material that allows broad visible light transmission of over 90% to pass therethrough, for example polycarbonate with thickness of 0.2 mm. The transmissive material can include, for example, a transmissive polymer or inorganic material that allows some light to pass through the material over a broad (e.g., broad spectrum visible light) or narrow wavelength band of interest. For example, Si and Ge are opaque to visible light but about 50% transmissive at wavelengths 2 μm and above. FIG. 5 illustrates an embodiment in which the sheath 302 is designed to have specialized optical properties; for example, a multi-layer sheath in which the thickness, number of layers, and refractive index of each layer is tuned to create a Bragg grating with a specialized transmissivity spectrum, such as a narrow wavelength band of transmission. Transmissive materials of embodiments of the present disclosure may have no light distortion/diffraction/scattering or minimal light distortion/diffraction/scattering properties (for example, polycarbonate for visible light, polyethylene for IR). Such transmissive material can also include, for example, translucent materials with some distortion/scattering with partial transmissivity, such as a polymer containing small bubbles or inclusions that scatter or diffract light.

Fibers of the present disclosure include fibers having an outer sheath with a hollow core that can have a wall thickness 106 (FIG. 1A) that can range from about 1 μm to about 500 μm. Some transmissive materials of the present disclosure that are opaque at a 10 mm wall thickness are reasonably transparent at a 10 μm wall thickness such that the material allows some transmission through a 10 μm thickness. The transmission through a homogenous material can be determined from both the refractive index and the absorption coefficient. The absorption coefficient (also known as the extinction coefficient) quantifies how quickly radiation of a particular wavelength is absorbed as it traverses through a material. For example, amorphous polyethylene has an absorption coefficient of 103.9 cm$^{-1}$; for 10 mm thickness the transmission through it is negligible while for a 10 μm thickness 90% of the light is transmitted through. Transmissive materials of the present disclosure can include crosslinked polymers (also called network polymers or, if thermally cured, thermosetting polymers) and thermoplastics as well as low melting point glass (i.e., glass that has a melting point at or below about 500° C., Thermoplastic polymers that might be included in embodiments of the present disclosure can optionally include one or more of the following materials: acrylonitrilebutadienestyrene (ABS); high density polyethylene (HDPE); low density polyethylene (LDPE); polyamide (Nylon); polyamide imide (PAI); polyarylate (PAR); polyaryletherketone (PAEK); polybutylene terephthalate (PBT); polycarbonate (PC); polyester; polyether sulfone (PES); polyetherketoneketone (PEKK); polyetheretherketone (PEEK or PK); polyetherimide (PEI, ULTEM); polyetherketone (PEK); polyetherketoneetherketoneketone (PEKEKK); polyethlyene (PE); polyethylene terephthalate (PET); polyimide (PI); polylactic acid (PLA); polymethyl methacrylate (PMMA); polyoxymethylene (POM); polyphenylene oxide (PPO); polyphenylene sulfide (PPS); polyphenylsulfone (PPSU); polyphthalamide (PPA); polyphthalate carbonate (PPC); polyproplyene (PP); polystyrene (PS); polysulfone (PSF); polyurethane (PU); polyvinyl chloride (PVC); polyvinylidene fluoride (PVDF); styrene acrylonitrile (SAN); styrene maleic anhydride (SMA); ultrahigh molecular weight polyethylene (UHMWPE); other thermoplastics, thermoplastic polymers and melt processable polymers.

Figure 2A:
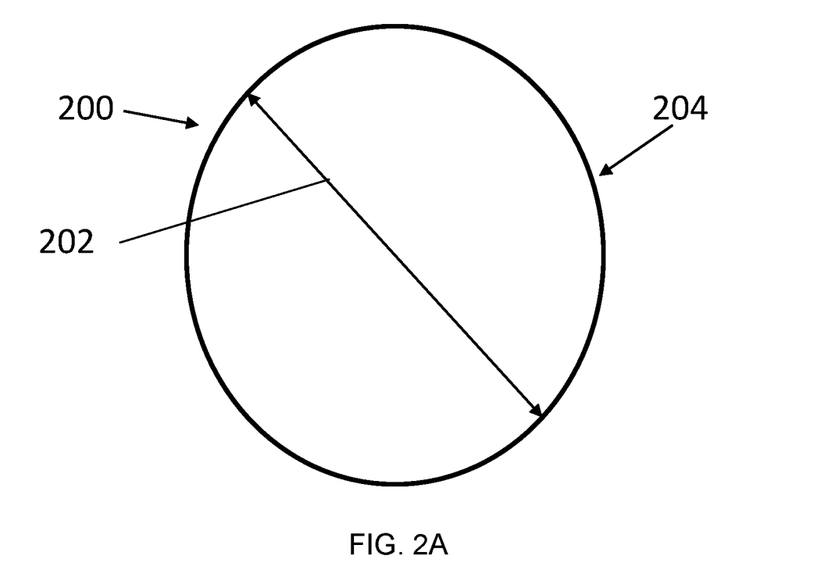
FIG. 2A is a cross-sectional view of an exemplary illustration of a retroreflective particle embodiment of the present disclosure.

Particles included with the hollow core of the sheath can be a variety of shapes including spherical, cylindrical, and three-dimensional polygons (such as for example, cube shapes or cylinders with a square cross-sectional shape), and may be composed of specialized glasses or polymers with a high index of refraction, and may include one or more full or partial coatings to enhance particle reflectivity such as a thin metallic coating or multilayered Bragg stacks made from 2 or more dielectric materials (e.g., polymers, glasses, or semiconductors). An embodiment of a retroreflective particle included in embodiments of the present disclosure is shown in FIG. 2A. Retroreflective particle 200 is generally spherical in shape and has a diameter 202. The retroreflective particles should be smaller than the diameter of the fiber's hollow core and can appear and behave like fine powder. For example, in the embodiment including the fiber embodiment of FIGS. 1A and 1B and the retroreflective particle of FIG. 2A, the diameter 202 of the retroreflective particles can range from about 1/1000 of the diameter 104 of the fiber's hollow core diameter to about ½ of the diameter 104 of the fiber's hollow core diameter. It is generally desirable for the index of refraction of the particle to be higher than the index of refraction of the matrix material outside of the particle; for example, if the matrix material is air and the particle is glass, or if the matrix material is a low index polymer like polytetrafluoroethylene and the particle is a high index of refraction inorganic material like flint glass, sapphire, or cubic zirconia.

Figure 2B:
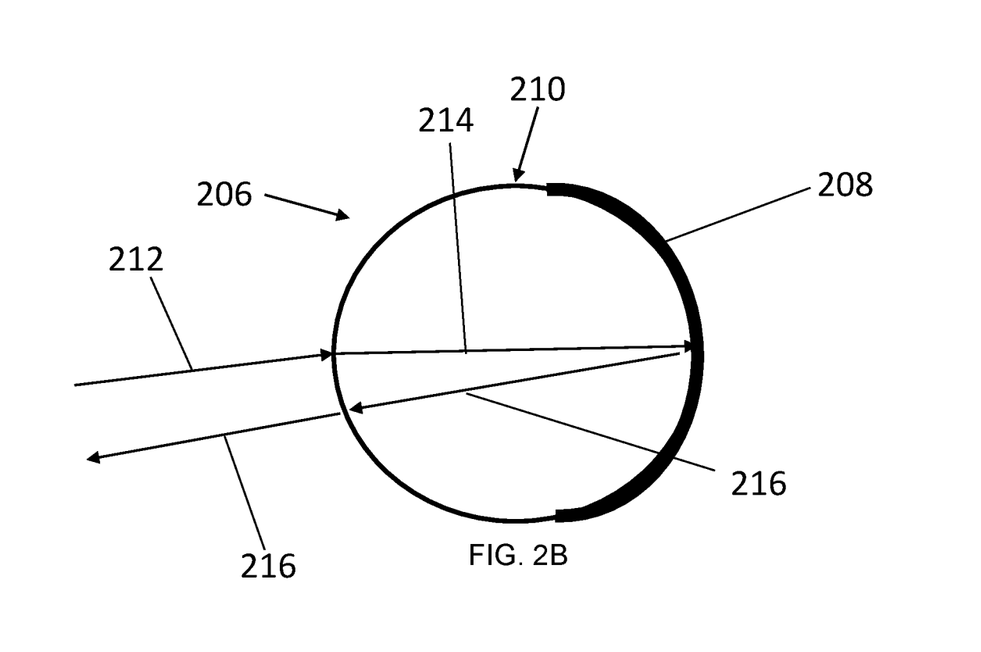
FIG. 2B is a cross-sectional view of another exemplary illustration of a retroreflective particle embodiment of the present disclosure.

Another embodiment of a retroreflective particle is shown in FIG. 2B. The retroreflective particle shown in FIG. 2B is a generally spherically shaped glass bead 206 similar in size and optical properties to the retroreflective particle is shown in FIG. 2A and further includes a metallic coating 208 covering about 50 percent of the exterior surface 210 of the glass bead 206. In the retroreflective fiber embodiment of the present disclosure including the glass bead 206, glass bead 206 is designed to retroreflect light. Light enters glass bead 212 and is refracted towards metallic coating 214 where it is reflected 216 and refracted to become parallel to the incident light 212, but travelling in the opposite direction relative to the incident light 212.

Figure 2C:
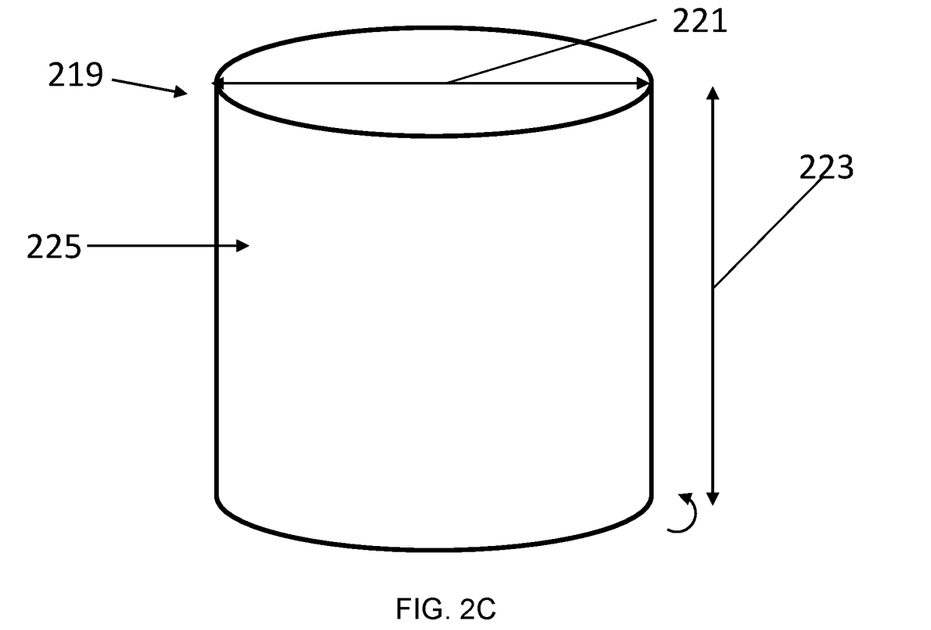
FIG. 2C is a perspective view of another exemplary illustration of a retroreflective particle embodiment of the present disclosure.

An embodiment of a retroreflective particle included in embodiments of the present disclosure is shown in FIG. 2C. Retroreflective cylindrical particle 219 is generally round in cross-section and elongated in length. Retroreflective cylindrical particle 219 is generally has a diameter 221 and a length 223. The retroreflective particles should be smaller than the diameter of the fiber's hollow core and can appear and behave like fine powder. For example, in the embodiment including the fiber embodiment of FIGS. 1A and 1B and the retroreflective particle of FIG. 2C, the diameter 221 of the retroreflective particles can range from about 1/1000 of the diameter 104 of the fiber's hollow core diameter to about ½ of the diameter 104 of the fiber's hollow core diameter. The length 223 of the retroreflective particles can range from about 1/10 to ½ of the diameter 104 of the fiber's hollow core diameter to about ½ of the diameter 104 of the fiber's hollow core diameter. It is generally desirable for the index of refraction of the particle to be higher than the index of refraction of the matrix material outside of the particle; for example, if the matrix material is air and the particle is glass, or if the matrix material is a low index polymer like polytetrafluoroethylene and the particle is a high index of refraction inorganic material like flint glass, sapphire, or cubic zirconia.

Another embodiment of the present disclosure can be the embodiment of FIG. 2C that further includes a metallic coating covering about 50 percent of the exterior cylindrical surface 225 of the retroreflective cylindrical particle 219 and running the length thereof as can be similarly seen in cross-section in FIG. 2B. In this embodiment, the retroreflective cylindrical particle 219 reflects incoming light similar to that shown in FIG. 2B for a metal coating sphere.

Figure 2D:
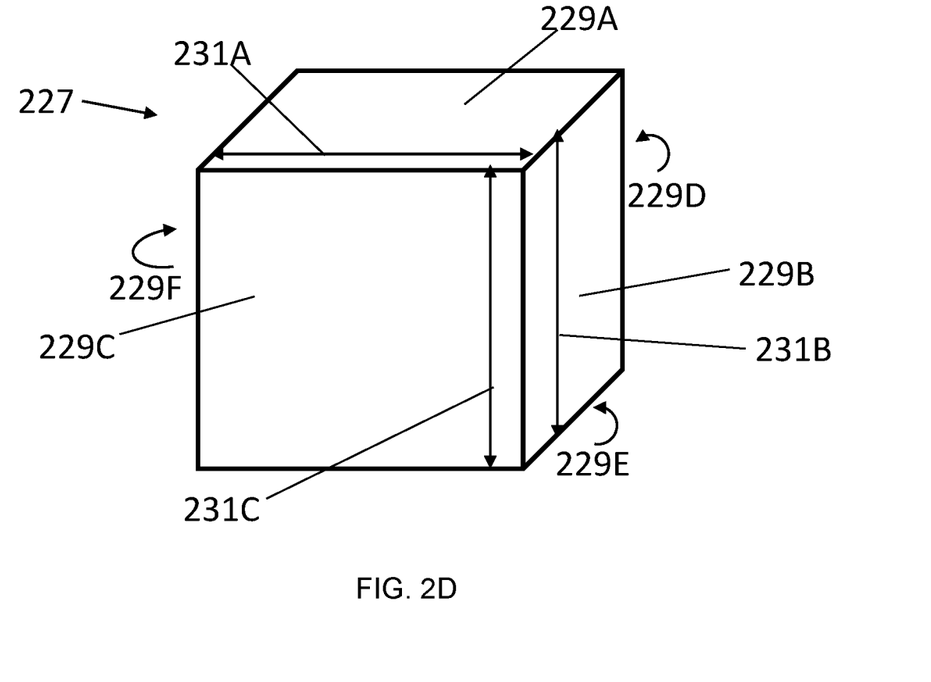
FIG. 2D is a perspective view of another exemplary illustration of a retroreflective particle embodiment of the present disclosure.

Another embodiment of a retroreflector particle is a corner-cube reflector, for example a transparent glass cube. The retroreflective particle shown in FIG. 2D is a generally cube shaped glass cube 227 similar in size and optical properties to the retroreflective particle is shown in FIG. 2A and the dimensions (231A, 231B and 231C) that can be approximately the same to result in faces (229A, 229B, 229C, 229D, 229E and 229F) of a uniform square shape or where the sides can be rectangular in shape where opposing faces of the particle are approximately the same dimensions and shape (e.g., 229A and 229C; 229B and 229F; and 229C and 229D). The dimensions of the sides can range from about 1/1000 of the hollow core diameter to about ½ of the hollow core diameter.

Figure 2E:
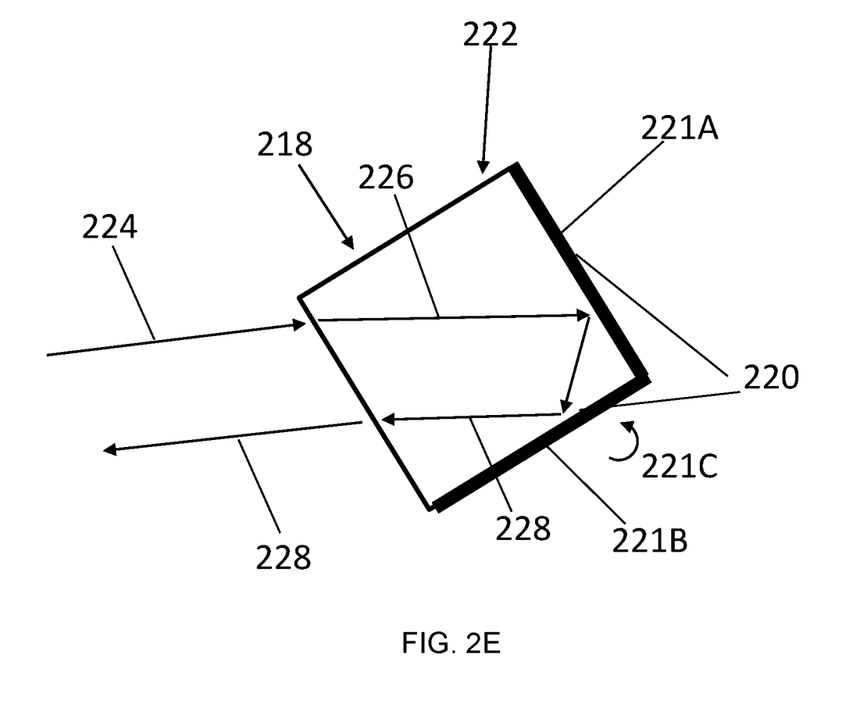
FIG. 2E is cross-sectional view of another exemplary illustration of a retroreflective particle embodiment of the present disclosure.

Another embodiment of a retroreflector particle is a corner-cube reflector similar to cube shaped glass cube 227, for example a transparent glass cube that includes a metallic coating covering about 50% (or three of six faces that share a common corner) of the exterior surface of the transparent cube, as shown in FIG. 2E. The retroreflective particle shown in FIG. 2E is a generally cube shaped glass cube 218 similar in size and optical properties to the retroreflective particle is shown in FIG. 2A and further includes a metallic coating 220 covering faces 221A and 221B (and a third hidden face 221C) and about 50 percent of the exterior surface 222 of the glass cube 218. In the retroreflective fiber embodiment of the present disclosure including the glass cube 218, glass cube 218 is designed to retroreflect light. Light enters glass cube 224 and is refracted towards metallic coating 226 where it's reflected by metallic coating 220 on side 221A toward side 221B and then reflected by metallic coating 220 on side 221B, so that the reflected light 228 is refracted to become parallel to the incident light 224, but travelling in the opposite direction relative to the incident light 224.

Retroreflective particles of the present disclosure, such as, for example, retroreflecting beads can be randomly packed inside fiber which makes construction easy. But random orientation can somewhat reduce efficiency of retroreflection. For retroreflecting beads with the transmissive side generally oriented towards a light source, for incidence angle up to 70°, high retroreflectivity persists, i.e., up to 65% of the solid hemisphere. This is shown in FIG. 2B.

Methods to make the outer sheath include melt extrusion, pultrusion, wire coating, and thermal fiber drawing. Filling the hollow core can be accomplished by pouring the retroreflective particles into it directly.

One embodiment of a fiber production method would be to use an extruder that melts and extrudes the sheath (including e.g., polymer layer or layers), but the extrusion die also has a flow path into which retroreflector particles can be entrained or injected into the hollow core of the extrusion. In another embodiment, a hollow cylindrical preform approximately 10-100 mm in diameter, and approximately 100-1000 mm in length, is thermally drawn by progressively heating from one end of the preform and subjecting the preform to tension, causing the preform to locally neck down into a continuous flow of fine diameter hollow filament. The retroreflective particles can be pre-filled into the preform, become entrained in the thermal draw flow and thereby filling the core of the produced retroreflective filament; or the retroreflective particles can be injected into the neck-down region of the thermal draw cone as filament is produced.

While the retroreflective particles can be filled directly into the fiber's hollow core, they can be mixed with a liquid carrier (for example, water, ethanol, acetone, mineral oil, silicone oil) and poured, injected, entrained, or diffused into the core. The suspending liquid carrier should not have a refractive index that match the particles refractive index, and ideally should be lower than the refractive index of the retroreflective particles. Spherical or cubic retroreflective particle shapes are most preferred to achieve efficient retroreflection. Other particles or chemicals can be added to the suspension of the retroreflective particles to improve suspension stability and flow when they are poured into the fiber's hollow core. Once the retroreflective particles are suspended in the liquid carrier and poured into the hollow core, the suspending liquid can be removed by, for example, by evaporation, sublimation, displacement by a gas, or displacement by another fluid that is then evaporated.

The suspending liquid carrier can also contain a small amount of binder that stays behind to hold the particle bed in place, but still the particles are mostly surrounded by air. Examples of binders includes acrylates, epoxies, urethanes, and any other thermoplastic or cross-linked network polymer. Embodiments of the present disclosure may preferably include a binder that is elastomeric for resiliency. Examples of binders possesses elastomeric properties include latex, silicone, urethane, and thermoplastic elastomers.

The binder can also have functional properties imparted by functional particles smaller than the retroreflective particles and can be hollow or solid. The functional particles could be of any shape, hollow or solid, and have a variety of properties such as reflective or refractive, have a stiffness strength (as defined by elastic modulus), toughness, (as defined by fracture toughness) or an index of refraction higher than the fiber sheath, binder, or retroreflective particles. The functional particles can be made of polymers, glasses, ceramics, and metals and metal compounds.

A couple of alternative ways of filling the fiber with retroreflective particles could be utilized. One such method for filling the fiber with retroreflective particles is via a multi-inlet die during the polymer melt extrusion process. As the molten polymer exits the die a separate stream for the retroreflective particle would be in the middle of the die. The retroreflective particle stream could be carried by a gas such as nitrogen or air or a liquid such as another molten polymer. If thermal drawing is utilized, the retroreflective particles can be entrained as the preform is pulled into fiber.

Figure 3:
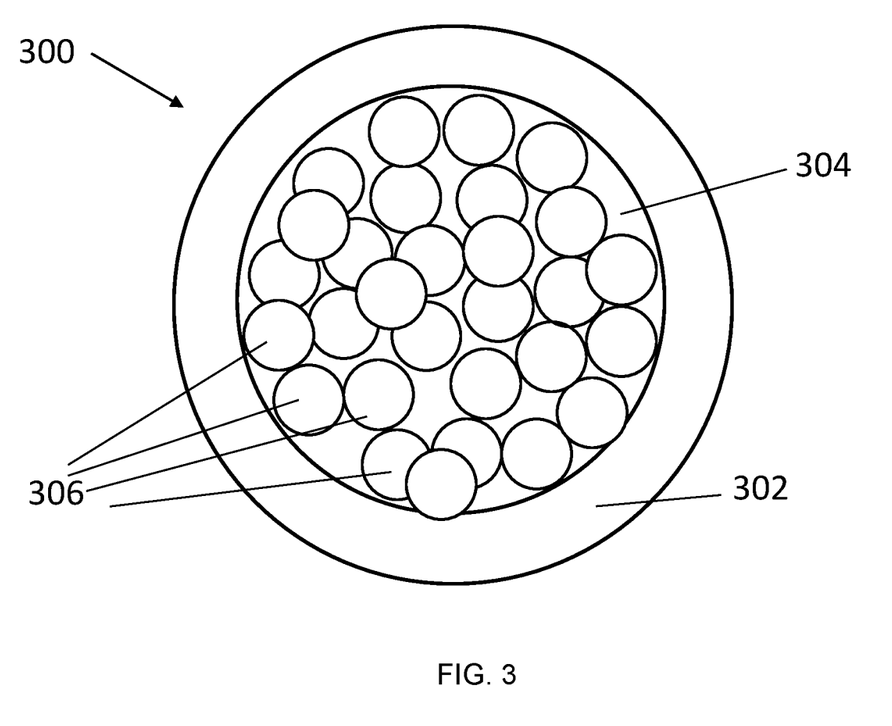
FIG. 3 is a cross-sectional view of a retroreflective fiber embodiment of the present disclosure.

An embodiment of the present disclosure is shown in FIG. 3 that includes a retroreflective fiber 300 including a sheath 302 and a hollow core 304 similar to that shown in FIGS. 1A and 1B where hollow core 304 includes a plurality of retroreflective particles (also referred to herein as the particle bed) 306, for example, the illustrative examples of particles included in FIGS. 2A-2E.

Other embodiments of the present disclosure include coatings disposed on the exterior surface 110 of sheath 104 (exemplified in FIG. 1A), on the interior surface 112 of sheath 104 (exemplified in FIG. 1A), and/or on the on the exterior surface 204 of the retroreflective particles themselves (for example, the illustrative examples of particles included in FIGS. 2A-2E). Such coatings can include, for example, coatings of Si or Ge that can allow IR transmission without visible transmission therethrough to make a selective retroreflector, such as, for example, a fiber that absorbs visible light while retroreflecting infrared light; polymer coatings that are visible light transmissive but IR reflective, such as, for example, polycarbonate and acrylic; and pigments and dyes for coloration and selective absorption/reflection/transmission, such as for example, azo, cyanines, quinones, phthalocyanines, naphthalocyanines, metal complex dyes, and photochromic dyes. Coating embodiments of the present disclosure can also include multi-layer coating (for example, sub-micron layers of alternative dielectrics or dielectric/conductors) to build a diffraction grating, narrow-pass filter, or narrow-band reflector. Examples of such multi-layer coatings can include PMMA, polystyrene, polycarbonate, norbornenes, PVDF, cyclo-olefine copolymers, silica, and chalcogenide glasses. Coatings disposed on the exterior surface 110 of sheath 104 (exemplified in FIG. 1A), on the interior surface 112 of sheath 104 (exemplified in FIG. 1A), and/or on the on the exterior surface 204 of the retroreflective particles themselves (for example, the illustrative examples of particles included in FIGS. 2A-2E) can also be utilized to enhance mechanical toughness (as measured by the yield strength, tensile strength, or fracture point), chemical resistance (as measured by physical integrity when subject to solvent immersion), thermal resiliency (as measured by glass transition temperature or thermal conductivity), etc. of the retroreflective fiber (such as, for example, epoxy and urethane coatings) as well as fillers such as, for example, nanoparticles can be added to the sheath 104 (exemplified in FIG. 1A), coatings, or binders included with the liquid suspension of the retroreflective particles used to fill the hollow core to enhance the index of refraction of the retroreflective fiber. Coatings can be applied in a number of ways, including but not limited to: spraying, dipping, or brushing; or vacuum evaporation and sputtering.

Figure 4:
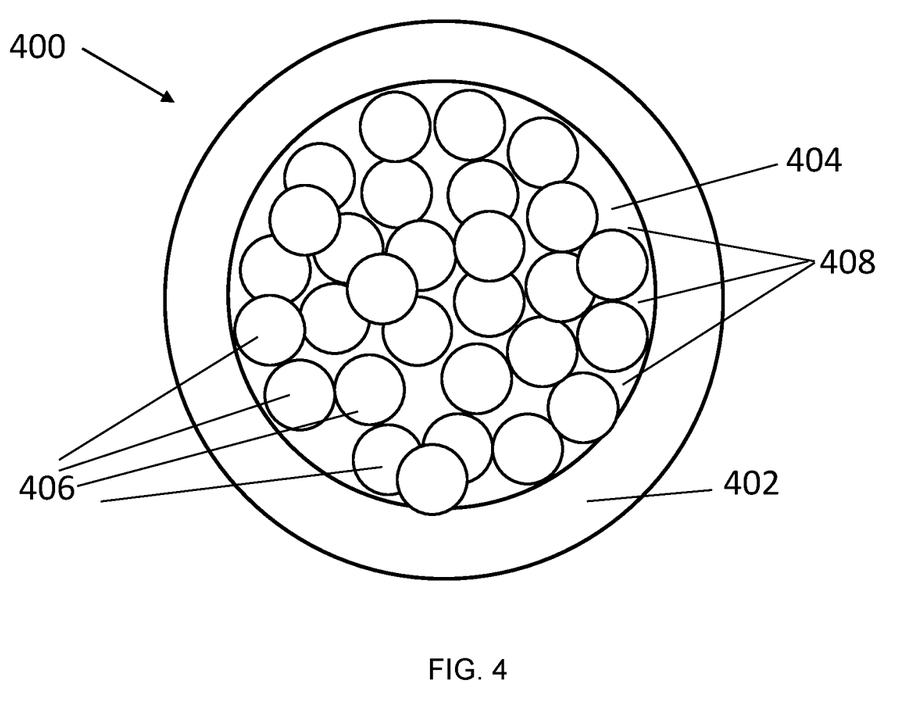
FIG. 4 is a cross-sectional view of a retroreflective fiber embodiment of the present disclosure, in which the free volume within the hollow core that is not occupied by retroreflective particles is fully or partially occupied by a liquid, gel, or solid binder.

Another embodiment of the present disclosure is shown in FIG. 4, in which the hollow portions of the core not filled with retroreflective particles is wholly or partially filled with a liquid, gel, solid binder or mixtures thereof. The binder may serve to enhance the mechanical stiffness, strength, toughness, or resiliency of the retroreflector fiber. Alternatively, the binder may modify or enhance the optical performance of the retroreflector fiber, for example by including microparticles or nanoparticles that have a high index of refraction; low index of refraction; highly reflectivity; or are hollow. The embodiment of the present disclosure is shown in FIG. 4 that includes a retroreflective fiber 400 including a sheath 402 and a core 404 similar to that shown in FIGS. 1A and 1B where the core 404 includes a plurality of retroreflective particles (also referred to herein as the particle bed) 406, for example, the illustrative examples of particles included in FIGS. 2A-2E and a filling 408 that includes a matrix or binder comprising liquid, gel, solid, gel or solid particles, entrained gas, evacuated space, or mixtures thereof. The matrix binder components that include liquid, gel, solid or mixtures thereof can provide mechanical support and/or modify the optical properties of the fiber.

In another embodiment shown in FIG. 5, the sheath itself is comprised of multiple material layers to achieve a given optical effect, such as optical filtering or lensing. For example, alternating layers of PC and PMMA transparent thermoplastic polymers can be arranged to create a filtering effect that only blocks a narrow band of incoming light. Alternating layers of PC and PMMA with tightly controlled thicknesses of 100-700 nm thick, for example, would be effective at selectively blocking particular wavelengths of visible light. The embodiment of the present disclosure is shown in FIG. 5 that includes a retroreflective fiber 500 including a sheath 602 and a hollow core 604 similar to that shown in FIGS. 1A and 1B where the hollow core 604 includes a plurality of retroreflective particles (also referred to herein as the particle bed) 606, for example, the illustrative examples of particles included FIGS. 2A-2E. Sheath 602 includes alternating layers of different materials 608 and 610 as described above. The number of total layers of sheath 602 can be 2 or more and the number of different materials used can be 2 or more. In the embodiment of FIG. 5, one example of the different material layers would be a stack of alternating layers of polycarbonate (refractive index=1.59) and polymethyl methacrylate (PMMA, refractive index=1.49). If the individual layer thicknesses are in the range of 0.07-0.13 microns, with at least eight layer pairs, then high reflection exceeding 90% in a narrow peak somewhere in the visible portion of the spectrum results.

Figure 6:
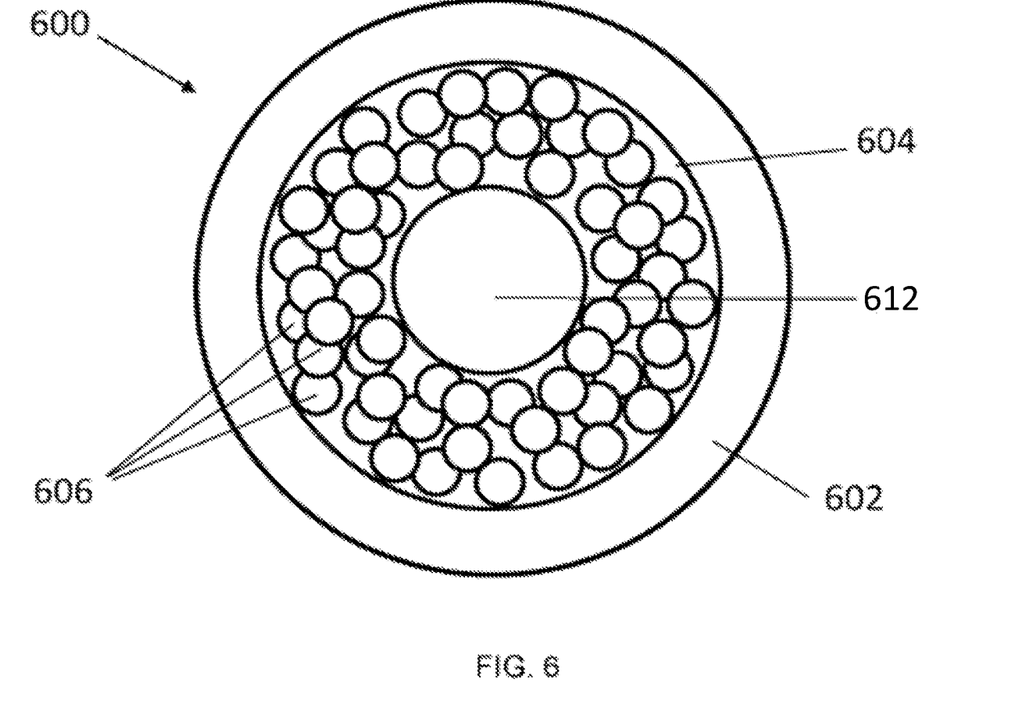
FIG. 6 is a cross-sectional view of a retroreflective fiber embodiment of the present disclosure in which the core includes both solid and hollow portions, wherein the retroreflective particles are disposed in the hollow portion of the core.

Another embodiment of the present disclosure is shown in FIG. 6, in which the core of the fiber includes both hollow and solid portions, with the hollow portions filled fully or partially filled with retroreflector particles. The solid portions of the core can serve multiple functions. In one embodiment, the solid portion of the core provides mechanical support to the fiber. For example, a polyaramid or polyamide fiber core would provide strength and stiffness to the fiber. In another embodiment, the solid portion of the core serves to enhance or modify the optical behavior of the fiber. For example, a reflective core could enhance the retroreflective effect. Or the core could have a different optical reflection or optical absorption compared to the sheath and retroreflective particles. Or the core could contain a fluorescent material such as rare earth oxides, phosphorescent material such as copper-activated or silver-activated zinc sulfide, and other transition metal compounds and rare earth compounds, pigment or an optically active dye. In another embodiment, the solid portion of the core is an optical waveguide that collects, distributes, or injects light throughout the fiber or in a concentrated manner at the fiber ends, for example to serve as a solar collector to concentrate ambient light.

Figure 7A:
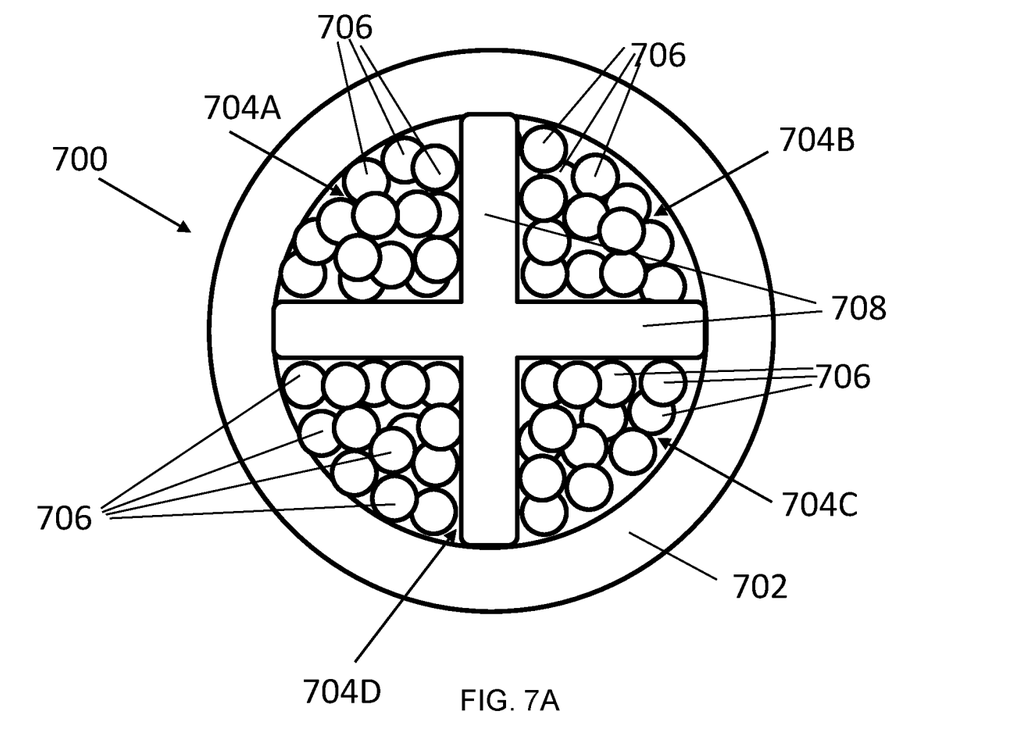
FIG. 7A is a cross-sectional view of retroreflective fiber embodiments of the present disclosure in which the core includes multiple solid and hollow portions, wherein the retroreflective particles are disposed in the hollow portions of the core.

The solid portion of the retroreflective fiber core could be introduced in a number of ways. A wire coating die could be used to introduce a thermally stable filament, such as a metal filament, into the core of the fiber during extrusion. The filament could also be coated with retroreflector particles, for example, the illustrative examples of particles included in FIGS. 2A-2E, with a small amount of polymer binder, in order to entrain the retroreflector particles into the hollow portion of the fiber core. A thermal draw process could be used with a spool of thermally stable filament, such as a carbon fiber filament or glass optical fiber, that is continuously fed into the thermal draw cone during filament production. The embodiment of the present disclosure is shown in FIG. 6 that includes a retroreflective fiber 600 including a sheath 602 and a hollow core 604 similar to that shown in FIGS. 1A and 1 B where the hollow core 604 includes a plurality of retroreflective particles (also referred to herein as the particle bed) 606, for example, the illustrative examples of particles included in FIGS. 2A-2E and a filament 612. The filament included in the hollow core can provide mechanical support and/or an optical backplane, the optical backplane function to enhance the internal reflection, absorption, or scattering of light in order to modify or improve the overall optical behavior of the fiber Another embodiment of the present invention is shown in FIG. 7A, in which the arrangement of hollow and solid portions in the core results in multiple distinct chambers within the fiber core. Each chamber can be configured with a unique combination of particles, fillers, and backplane properties to achieve different optical effects, including varying retroreflected color (or more generally wavelengths) and/or retroreflected intensity across a broadband or narrow band of wavelengths. By retro-reflected color, we mean the spectral character of the retroreflected light; for example, if illuminated by broadband white light, one chamber could strongly reflect blue light, while another chamber might strongly reflect red light. By retro-reflected intensity, we mean the intensity of the retroreflected light; for example, if illuminated by a broadband white light, one chamber might retroreflect 90% of that light, while another chamber might retroreflect 20% of the broadband light. Combining these effects, for example, when illuminated by broadband white light, one chamber might generate an intense red reflection, while another chamber might generate a less intense, blue reflection. The resulting retroreflective fiber would have different optical properties depending on details of illumination, such as illumination angle, illumination intensity, illumination spectral composition (color), and viewing angle.

The solid portion of the core can be composed of solid material, or include fillers, that result in desirable mechanical or optical properties. The solid portion of the core may include, for example, chopped glass or carbon fiber; metallic, ceramic, or graphitic particles; or pigments, dyes, and fillers that change the optical properties of the solid portion of the core. The solid portion of the core could also be coated to achieve a particularly desirable optical behavior, such as metallized via evaporation or sputtering to achieve a desired reflectivity.

One embodiment of the present disclosure is shown in FIG. 7A that includes a retroreflective fiber 700 including a sheath 702 and a hollow core similar to that shown in FIGS. 1A and 1B where the hollow core is separated into four hollow chambers 704A, 704B, 704C and 704D by barrier 708, however the number of chambers can be as few as 2, as many as 50, and any number in between and each chamber runs the length of the fiber 700. Each hollow chamber 704A, 704B, 704C and 704D includes a plurality of retroreflective particles (also referred to herein as the particle bed) 706, for example, the illustrative examples of particles included in FIGS. 2A-2E and the particles in the different chambers can be the same or different from those in another chamber. The barriers 708 could be transparent, opaque, absorptive, or reflective to achieve different optical effects. Each hollow chamber 704A, 704B, 704C and 704D can have a unique particle optical property and/or optical backplane.

Figure 7B:
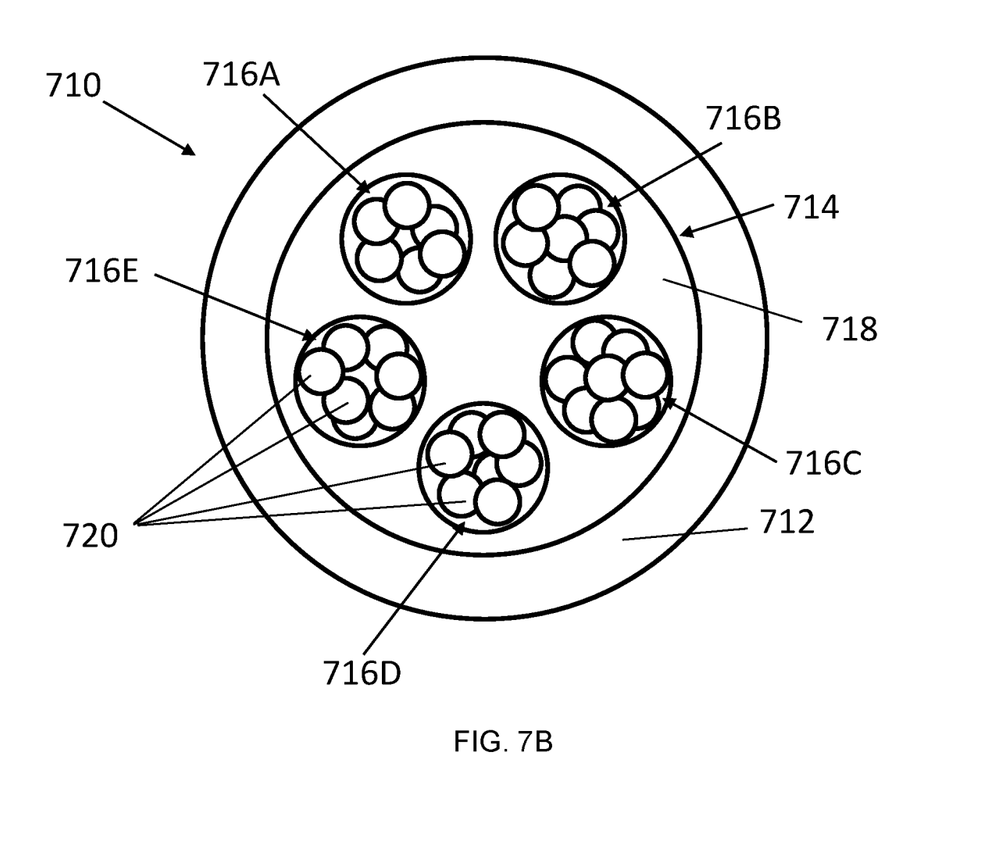
FIG. 7B is a cross-sectional view of retroreflective fiber embodiments of the present disclosure in which the core includes multiple solid and hollow portions, wherein the retroreflective particles are disposed in the cylindrical hollow portions of the core.

Another embodiment of the present disclosure is shown in FIG. 7B that includes a retroreflective fiber 710 including a sheath 712 and a core 714, where the core includes five hollow chambers 716A, 716B, 716C, 716D, and 716E that are generally spherical in cross-section with each chamber runs the length of the fiber 710 (resulting in a generally overall cylindrical shape) separated by a barrier 718. The number of chambers can be as many as 2, as many as 50, and any number in between. Each chamber 716A, 716B, 716C, 716D, and 716E includes a plurality of retroreflective particles (also referred to herein as the particle bed) 720, for example, the illustrative examples of particles included in FIGS. 2A-2E and the particles in the different chambers can be the same or different from those in another chamber. Compared to the embodiment of FIG. 7A, the elongated cylindrical shape of the hollow chambers 716A, 716B, 716C, 716D, and 716E in FIG. 7B may simplify manufacturing and improve the durability of the barriers 718. Barrier 718 in FIG. 7B would be at least partially transmissive to allow external light to interact with the retroreflector particles 720 inside the hollow chambers 716A, 716B, 716C, 716D, and 716E. Each chamber 716A, 716B, 716C, 716D, and 716E can have a unique particle optical property and/or optical backplane.

Figure 8:
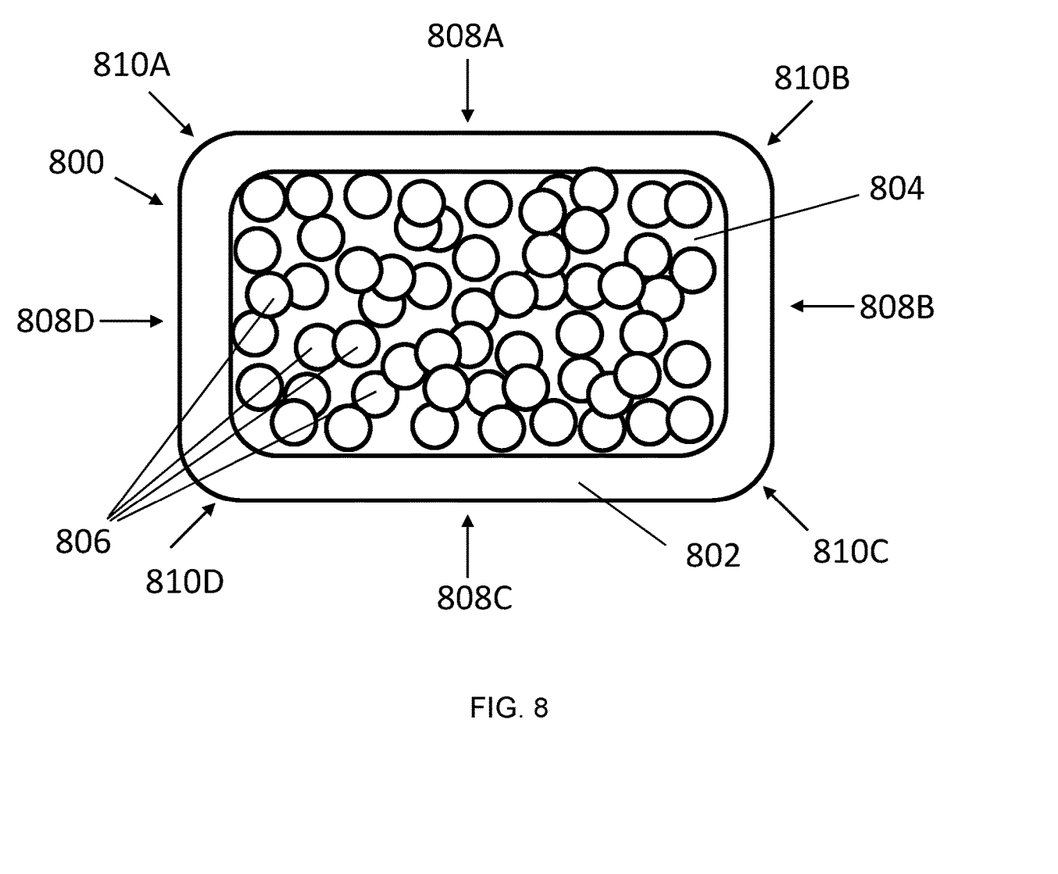
FIG. 8 is a cross-sectional view of a retroreflective fiber embodiment of the present disclosure, in which the fiber has a non-round cross-sectional shape.

Another embodiment of the present disclosure is shown in FIG. 8 that includes a retroreflective fiber 800 including a sheath 802 and a hollow core 804 similar to that shown in FIGS. 1A and 1B where hollow core 804 includes a plurality of retroreflective particles (also referred to herein as the particle bed) 806, for example, the illustrative examples of particles included in FIGS. 2A-2E shape. Retroreflective sheath 800 includes four sides 808A, 808B, 808C and 808D and four rounded corners 810A, 8106, 810C and 810D Aspects of the present disclosure also include textiles or fabric, garments made therefrom and methods of making the aforementioned that includes one or more embodiments of the retroreflective fibers of the present disclosure.

The retroreflective fiber embodiments of the present disclosure can be incorporated into textile manufacture processes including, for example, but not limited to braiding, weaving and knitting. As such, the fabric can be a knit, braid, woven textile, felt, or bonded fiber mat. The retroreflective fibers of the present disclosure can be integrated or formed into textiles including, for example, but not limited to ropes, braids, fabrics, and knits. These textile and fabric goods can be wholly or partially comprised of retroreflector fibers. Retroreflector fibers of the present disclosure can also be integrated as single fiber monofilament, or as multi-fiber yarn, or can be co-mingled or plied with conventional fibers, yarns, and monofilaments. The textiles can be cut and sewn into garments (e.g., jackets, pants, shirts, hats, etc.), shelters (e.g., tents etc.), parachutes, and other textile goods that require retroreflective properties. The textiles can also be integrated with a polymer matrix to create a structural or ballistic composites with retroreflective characteristics as well as garments and shelters made therefrom.

Examples One such fiber fabricated consisted of a hollow polycarbonate sheath of outer diameter 500 microns and thickness 50 microns filled with metal-coated retroreflective beads of average diameter 50 microns.

Thus, while there have been shown, described and pointed out, fundamental novel features of the present disclosure as applied to the exemplary embodiments thereof, it will be understood that various omissions and substitutions and changes in the form and details of devices and methods illustrated, and in their operation, may be made by those skilled in the art without departing from the spirit or scope of the present disclosure. Moreover, it is expressly intended that all combinations of those elements and/or method steps, which perform substantially the same function in substantially the same way to achieve the same results, are within the scope of the present disclosure. Moreover, it should be recognized that structures and/or elements and/or method steps shown and/or described in connection with any disclosed form or embodiment of the present disclosure may be incorporated in any other disclosed or described or suggested form or embodiment as a general matter of design choice. It is the intention, therefore, to be limited only as indicated by the scope of the claims appended hereto.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While there have been shown, described and pointed out, fundamental features of the present disclosure as applied to the exemplary embodiments thereof, it will be understood that various omissions and substitutions and changes in the form and details of compositions, devices and methods illustrated, and in their operation, may be made by those skilled in the art without departing from the spirit or scope of the present disclosure. Moreover, it is expressly intended that all combinations of those elements and/or method steps, which perform substantially the same function in substantially the same way to achieve the same results, are within the scope of the present disclosure. Moreover, it should be recognized that structures and/or elements and/or method steps shown and/or described in connection with any disclosed form or embodiment of the present disclosure may be incorporated in any other disclosed or described or suggested form or embodiment as a general matter of design choice. It is the intention, therefore, to be limited only as indicated by the scope of the claims appended hereto.

What is claimed is:

1. A retroreflective fiber comprising:
   a sheath comprised of a transmissive material;
   a core that includes both solid and hollow portions, wherein the core is circumscribed by the sheath and extends longitudinally along the length of the retroreflective fiber; and
   one or more retroreflective particles disposed in the hollow portions of the core,
   wherein the solid portion of the core is composed of a metal fiber, a carbon fiber, a glass fiber, a polymer fiber, a natural fiber, or an optical waveguide.

2. The fiber of claim 1, wherein the solid portion of the core has higher elastic modulus than the sheath material.

3. The fiber of claim 1, wherein the solid portion of the core is configured to enhance the retroreflective response of the fiber, has a different optical reflection or has a different optical absorption compared to the sheath and retroreflective particles.

4. The fiber of claim 1, wherein the fiber contains a fluorescent material.

5. The fiber of claim 1, wherein the solid portion of the core has a different optical absorption compared to the sheath and retroreflective particles.

6. The fiber of claim 1, wherein the fiber contains a phosphorescent material.

7. The fiber of claim 1, wherein the fiber contains a pigment.

8. The fiber of claim 1, wherein the fiber contains an optically active dye.

9. A retroreflective fiber comprising,
   a sheath comprised of a transmissive material;
   a core that includes both solid and hollow portions, wherein the core is circumscribed by the sheath and extends longitudinally along the length of the retroreflective fiber; and
   one or more retroreflective particles disposed in the hollow portions of the core,
   wherein the core includes multiple hollow portions, separated by one or more solid portions, and where the composition or configuration of retroreflective particles and solid backplane in each hollow portion results in one or more unique retroreflective optical characteristics including at least one of retroreflection color or retroreflection intensity.

10. The fiber of claim 9, wherein the solid portion of the core is composed of a metal fiber.

11. The fiber of claim 9, wherein the solid portion of the core is composed of a carbon fiber.

12. The fiber of claim 9, wherein the solid portion of the core is composed of a glass fiber.

13. The fiber of claim 9, wherein the solid portion of the core is composed of a polymer fiber.

14. The fiber of claim 9, wherein the solid portion of the core is composed of a natural fiber.

15. The fiber of claim 9, wherein the solid portion of the core is composed of an optical waveguide.

16. The fiber of claim 9, wherein the fiber contains a phosphorescent material.

17. The fiber of claim 9, wherein the fiber contains a pigment.

18. The fiber of claim 9, wherein the fiber contains an optically active dye.

19. The fiber of claim 9, wherein the fiber contains a fluorescent material.

20. The fiber of claim 9, wherein the solid portion of the core is configured to enhance the retroreflective response of the fiber, has a different optical reflection or has a different optical absorption compared to the sheath and retroreflective particles.

* * * * *